United States Patent [19]
Johnson

[11] 3,846,956
[45] Nov. 12, 1974

[54] METHOD OF AND APPARATUS FOR MAKING SEED TAPE

[75] Inventor: Carl W. Johnson, Neenah, Wis.

[73] Assignee: Ferry-Morse Seed Company, Mountain View, Calif.

[22] Filed: May 2, 1973

[21] Appl. No.: 356,485

[52] U.S. Cl............................ 53/28, 53/30, 53/180, 221/211
[51] Int. Cl.............................................. B65b 9/04
[58] Field of Search ................ 53/28, 30, 180, 184; 221/211

[56] References Cited
UNITED STATES PATENTS

| | | | |
|---|---|---|---|
| 1,386,105 | 8/1921 | Gray | 53/180 |
| 2,775,084 | 12/1956 | Stirn et al. | 53/184 X |
| 3,032,818, | 5/1962 | Branick | 53/30 X |
| 3,354,611 | 11/1967 | Powell | 53/184 |
| 3,387,746 | 6/1968 | Whipple | 221/211 |
| 3,426,505 | 2/1969 | Cloud | 53/184 |
| 3,445,981 | 5/1969 | Hori | 53/180 X |
| 3,561,187 | 2/1971 | Rohnert et al. | 53/180 X |
| 3,638,393 | 2/1972 | Datta | 53/180 |
| 3,659,396 | 5/1972 | Baker | 53/180 |
| 3,683,583 | 8/1972 | Cochran et al. | 53/28 |
| 3,715,057 | 2/1973 | Becker | 221/211 |
| 3,772,849 | 11/1973 | Tobin et al. | 53/180 |
| 3,775,034 | 11/1973 | Knapp | 221/211 X |

*Primary Examiner*—Robert L. Spruill
*Attorney, Agent, or Firm*—Burton and Parker

[57] ABSTRACT

A first strip of tape is moved at constant speed over a rotating wheel and seed pockets are formed in the tape by vacuum, while a superjacent rotating wheel receives seeds from a source and retains selected seeds by vacuum. At the point of wheel tangency, the seed wheel vacuum is released, depositing seeds in the tape pockets. A second strip of tape is brought into contact with the first tape, and the two are moved synchronously while being heat sealed together; then the resultant seed tape is wound about a spool.

19 Claims, 15 Drawing Figures

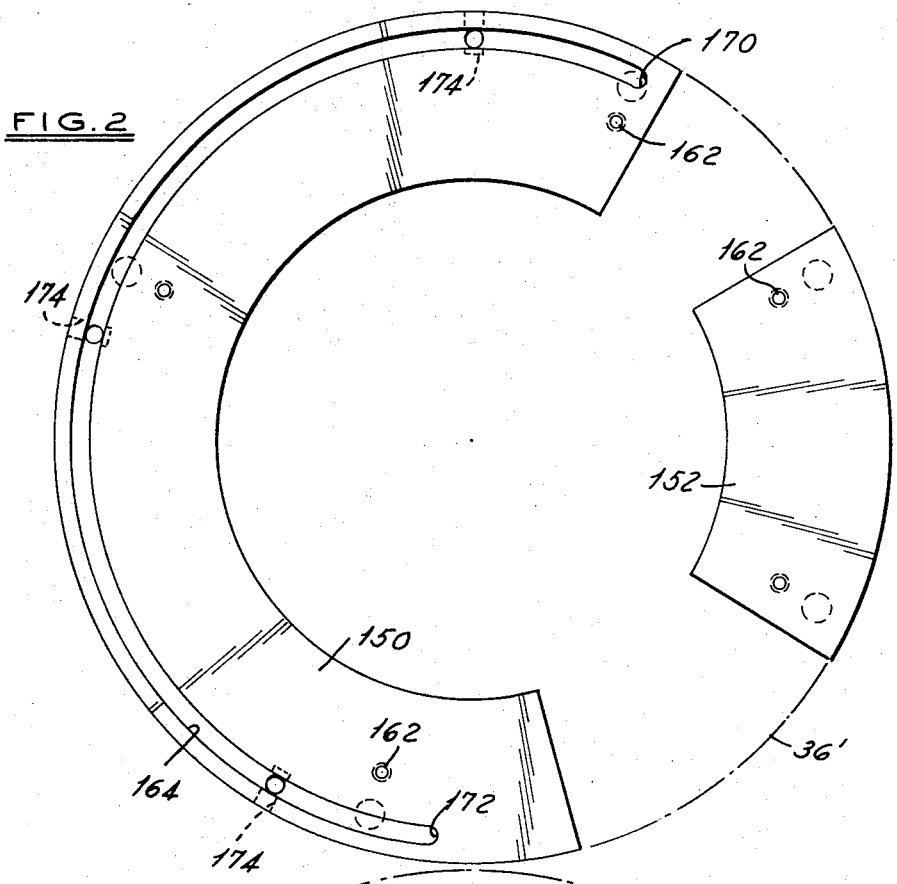
FIG.2
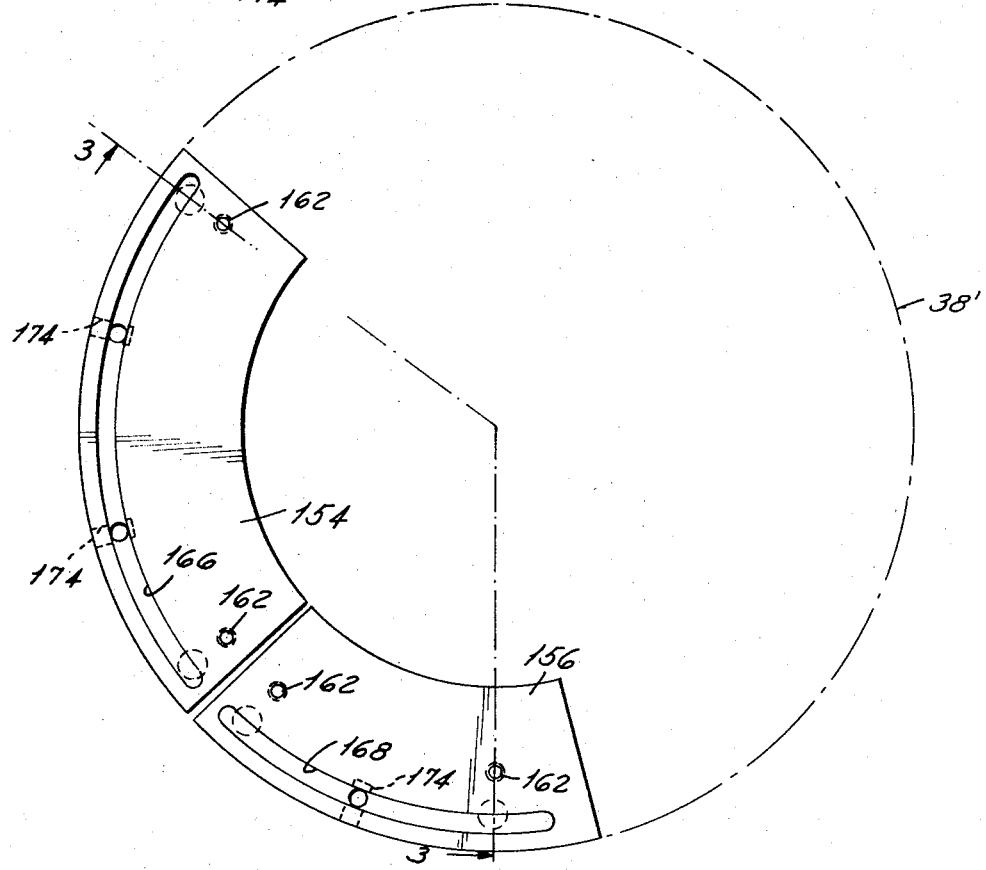

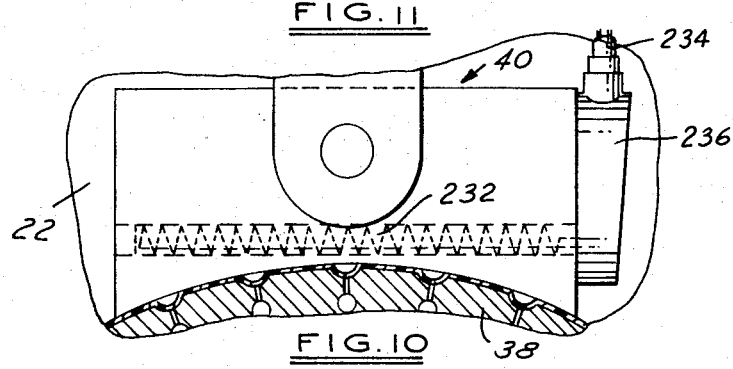
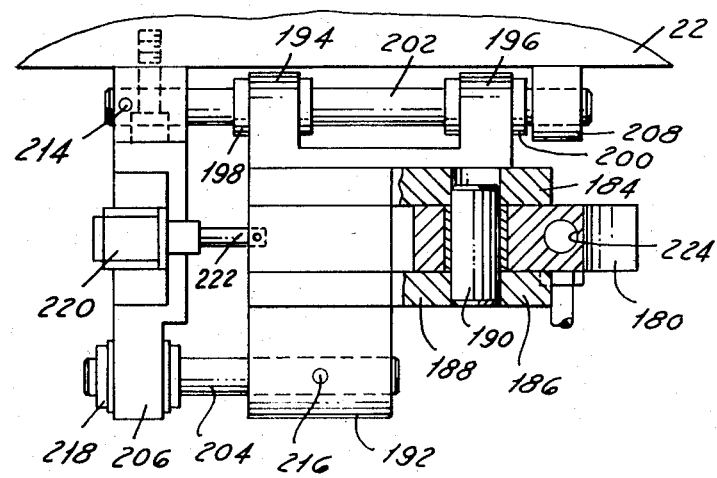
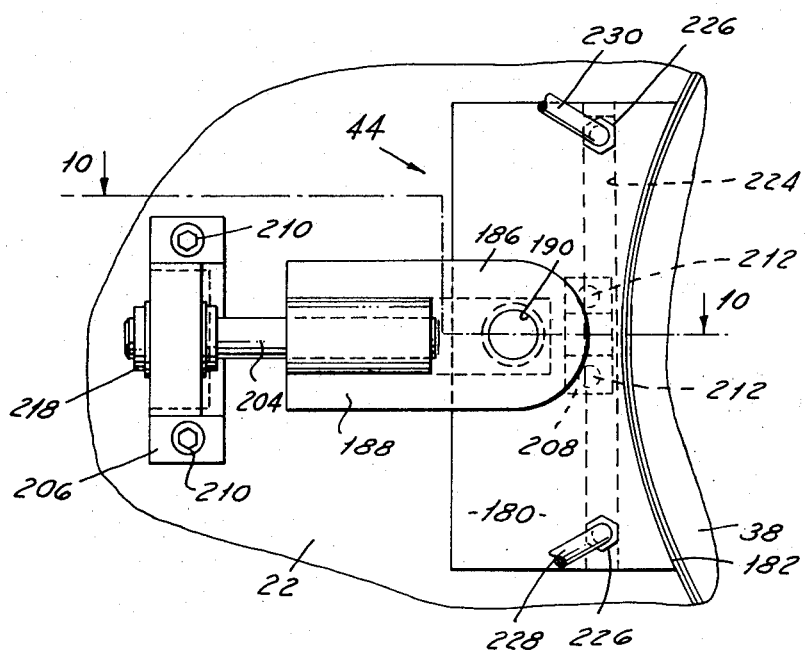

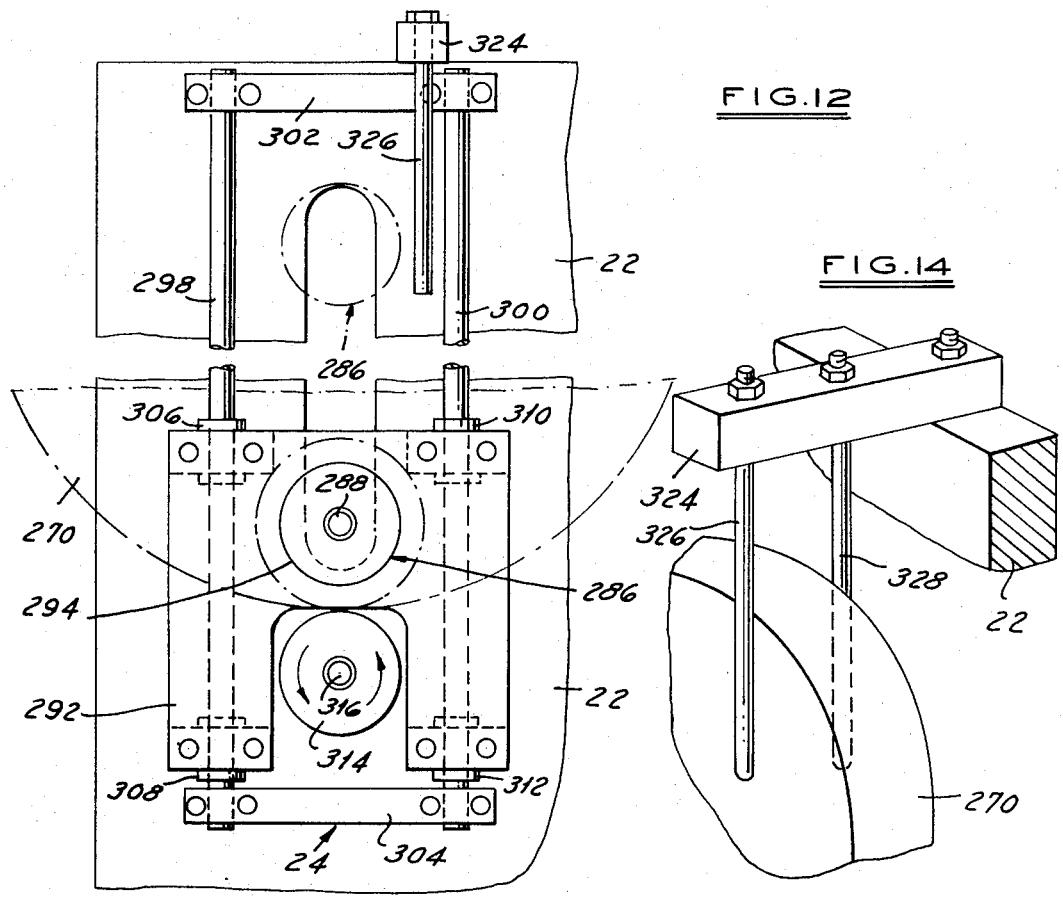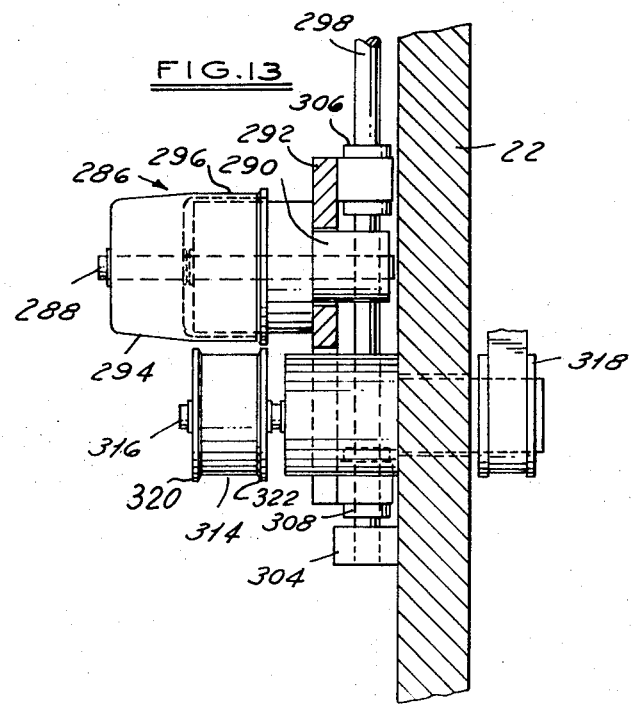

METHOD OF AND APPARATUS FOR MAKING SEED TAPE

BACKGROUND OF THE INVENTION

1. Field of the Invention

The invention lies generally in the field of package making, and more specifically relates to a method of and apparatus for making seed tape wherein a first water soluble tape is provided with uniformly spaced seed pockets by vacuum forming, seeds are deposited in the pockets, a second water soluble tape is superimposed on the first to close the pockets, and the two tapes with the seed encapsulated therein are heat sealed together prior to being wound on a spool or reel.

2. Description of the Prior Art

The earliest patent found relating to a seed tape forming machine is U.S. Pat. No. 1,160,278, wherein seeds delivered to a chute are picked up by vacuum nipples on a rotating wheel and deposited on a troughed paper tape which has glue distributed along its surface, and the tape edges are folded together to provide a closed envelope.

Later U.S. Pat. Nos. such as 3,046,714 and 3,456,386 disclose a seed carrier such as a strip or string having adhesive applied thereto, which strip is passed through a hopper to adhere seeds to the carrier. A cover strip or overwrap is thereafter applied to provide a closed seed container. Still later endeavors to provide suitable methods and machines for making these seed tapes are exemplified by U.S. Pat. Nos. 3,561,187 and 3,683,583. Both disclose a horizontally rotating disk having vacuum pickup nozzles which dip into a seed hopper to pick up individual seeds and transfer them to a seed deposit station. A strip of polyethylene tape is moistened along one marginal edge, and is formed into a V shape as it is fed to the deposit station, where seeds are dropped into the trough of the tape. The tape is passed between forming members and thereafter between rollers to seal the moistened edge against the remaining portion of the tape.

The prior art also includes various other patents directed to wrapping or packaging goods other than seeds which employ a continuous moving web upon which the goods is deposited, with the web being thereafter folded and sealed to provide a closed package. U.S. Pat. Nos. 3,466,836 and 3,532,516 both disclose methods of packaging including these steps. Thus it can be seen that in the seed packaging art, as well as other related arts, the most recent attempts have been uniformly directed to providing a moving web or strip which is first formed by means of guides or the like into a trough-like configuration to assist in article retention. The article or material to be packaged is then deposited on the web, and the web is fed through additional forming members to close it upon itself enveloping the article or material, and the web is subsequently sealed.

In handling comparatively large articles which may be fairly easily and conveniently segregated and fed individually, and in handling materials such as pastes, powders and semi-liquids, which are susceptible to feeding by conventional means, little difficulty is encountered in packaging by the above recited methods which employ a continuous package material such as a web of plastic onto which the articles or materials are deposited by a dispensing device. However, in handling tiny articles such as seeds, which are generally not of uniform or regular shape, and may vary considerably in size as well, the problems are compounded considerably.

Ideally, a seed tape should contain individual seeds spaced apart uniformly throughout the length of the tape, with each separate seed being retained against migration along the tape or loss by dropping out of the tape. During manufacture of the tape the seeds should be protected from conditions which might have any adverse effect on their germination characteristics, such as moisture, high temperature, etc. One of the most difficult to solve of the problems in achieving the ideal seed tape is that of picking up and delivering to the web or strip only a single seed at a time, and depositing these single seeds in uniformly spaced apart relation along the web. The prior art has not been successful in the solution of this problem. While certain of the larger, regularly shaped seeds are fairly readily handled by the pickup devices shown in the above patents, difficulty has been experienced in handling the tinier, irregularly shaped seeds.

In the processing of seeds for sale, great care is exercised by the seed companies in controlling the moisture content of the seed. If the moisture content is not maintained within certain limits, the germination can be adversely affected. In the prior art, U.S. Pat. Nos. such as 3,561,187; 3,511,016 and 3,683,583 contemplate moistening an edge of the plastic tape to make it tacky prior to depositing seeds thereon, and thereafter folding and sealing the tape upon itself along the moistened, tacky edge by passing it between a pair of rollers. This introduces a certain amount of moisture into the seed tape, which under certain conditions can have an adverse effect on the germination characteristics of the seed.

Another problem which has not been adequately solved by the prior art is that of insuring uniform spacing of the seeds along the strip of tape. In the devices for making seed tape which are presently in commercial use, and which incorporate the teachings of the above patents, the seeds are picked up and transferred by a vacuum nozzle which is moving in a generally horizontal, circular path. The plastic tape, on the other hand, is moving in a linear path beneath the nozzle, and the seeds are released from the nozzle when these two paths are in vertical alignment, the seeds dropping by gravity onto the moving tape. As the seeds are dropped, they have a vertical component of velocity due to gravity, and a horizontal component of velocity, which is presumably, or at least ideally, nearly equal to the horizontal speed of the tape. Therefore, the seeds have a resultant velocity that is different in both direction and magnitude from that of the tape, so that the seeds will not come to rest at their point of initial contact with the tape. Furthermore, the moving tape is under tension, and is somewhat resilient, so that there is a tendency for the seeds to bounce as they contact the tape. These factors have mitigated against achieving uniform spacing of the seeds along the tape.

In the prior art machines for making seed tape as shown for example in U.S. Pat. Nos. 3,561,187 and 3,683,583, the strip of tape is initially moistened, and is thereafter sealed by urging the moistened surface against the remaining surface as by passing the tape between pairs of rollers. This manner of closing the tape to provide an envelope for the seed has not proved entirely satisfactory, a problem which the later of the two patents alludes to and proposes to solve, but falls short. The problem of introducing moisture to the seed and its possible effect on germination has been mentioned. Application of moisture to one entire surface of the tape as contemplated will in many instances adversely affect the germination characteristics of the seed, albeit possibly providing a more reliable seal. On the other hand, if only a marginal edge of the tape is moistened, then an edge seal only is possible, allowing the seeds to migrate along the tape. Ideally, each seed should occupy a separate compartment which has a continuous peripheral seal, a condition not achievable with this prior art apparatus. Even assuming that an adequate seal is possible by combining sufficient roller pressure with moisture covering one surface of the tape, the rollers of the prior art actually engage each seed as it passes therebetween, tending to crush the seed. Obviously, this may well result in damaged seeds, especially those which are somewhat delicate.

SUMMARY OF THE INVENTION

A method of and apparatus for making seed tape wherein a first strip of tape is fed into contact with a moving member having pockets therein, and corresponding pockets are formed in the tape, and a second member moving synchronously with the first and superposed therewith deposits a single seed into each of the pockets. Before the tape with seeds in its pockets leaves the first member, a second tape is fed into aligned relation with the first tape, covering the pockets, and the tapes are heat sealed together.

By providing the aforesaid pockets or recesses in the carrier tape before deposit of the seeds onto the tape, and the various other features disclosed herein, many of the problems presented in the making of seed tape which have not heretofore been solved, are obviated. The process of the instant invention requires little or no moistening of the tape, and if moisture is utilized to enhance the seed, it is substantially immediately evaporated by passing the tape under a heated shoe. Therefore the seeds are not subjected to any conditions of moisture which might adversely affect their germination. Furthermore, there is no problem with gaps in the tape seal, as may occur with the above mentioned prior art devices. There is in addition provided a tape seal which is reliable and which does not exert any force against the seeds during the sealing operation, while sealing the complete periphery about each seed pocket.

Employing the teachings of the instant invention, the seeds are carried on a member moving in the same vertical plane and in the same direction as the tape, and each seed is deposited in a pocket formed in the tape, so that positive location of the seeds on the tape is insured. The pockets formed in the tape are of sufficient size that there is little or no danger of a seed being dislodged from its pocket before the cover tape is applied and the pocket sealed to retain the seed. Rather than dipping into a store of seeds, this disclosure contemplates gently dropping seeds continuously atop a rotating wheel having vacuum nozzles spaced about its periphery, the excess seeds falling by gravity from the wheel as it rotates. This is a more positive and reliable manner of segregating and picking up individual seeds than is shown in the prior art.

Sealing of the tape is effected while the carrier tape is still in contact with the pocket wheel. Thus the heated pressure shoe which effects the seal makes uniform contact throughout the sealing area, i.e., completely encircling each seed pocket. However, the pressure shoe does not actually contact the seeds in the pockets, and so there is little if any danger of any appreciable amount of heat being transmitted to the seed which could have an adverse effect on germination. Furthermore, there is no chance that the seeds will be crushed during the sealing operation, as could happen with prior art devices wherein the sealing rollers exert pressure on the seeds as the tape passes therebetween.

The use of two separate strips of tape in the seed tape manufacturing process obviates the necessity of folding the tape upon itself to provide a closed envelope or the like. The problems attendant to folding the tape are obvious, and some of them are alluded to in patent 3,683,583, which proposes a solution to the problem of providing an adequate seal when large seeds are being handled. The two strips of tape are fed flat, and this can be much more easily accomplished, and better control of the tape achieved, than where, as in the prior art, the tape must be fed through some sort of forming member. Another advantage of the instant invention is that two or more rows of seeds may be deposited on the carrier tape simultaneously and the tape thereafter slit longitudinally after the cover tape is applied to provide a plurality of seed tapes in a single operation.

BRIEF DESCRIPTION OF THE DRAWINGS

FIG. 2 is an enlarged front elevation of commutators for supplying air and vacuum to the two wheels of the machine shown in phantom therein, the upper wheel having seed pickup means and the lower wheel tape pocket forming means;

FIG. 9 is a front elevation of one of the pressure shoes for heating and cooling the tape, the cooling shoe being shown;

FIG. 10 is a top elevation, partly in section of the pressure shoe of FIG. 9, taken along line 10—10 of FIG. 9;

FIG. 11 is a partial front elevation of a heating pressure shoe, with the pocket forming wheel shown partly in section to indicate the relationship between the shoe and wheel;

FIG. 12 is a front elevation of one of the tape supporting and unwinding mechanisms of the seed tape making machine;

FIG. 13 is a side elevation, partly in section, of the tape supporting and unwinding mechanism of FIG. 12;

FIG. 14 is a partial perspective showing tape guide means associated with the mechanism of FIGS. 12 and 13.

DESCRIPTION OF THE PREFERRED EMBODIMENT

Figure 1:
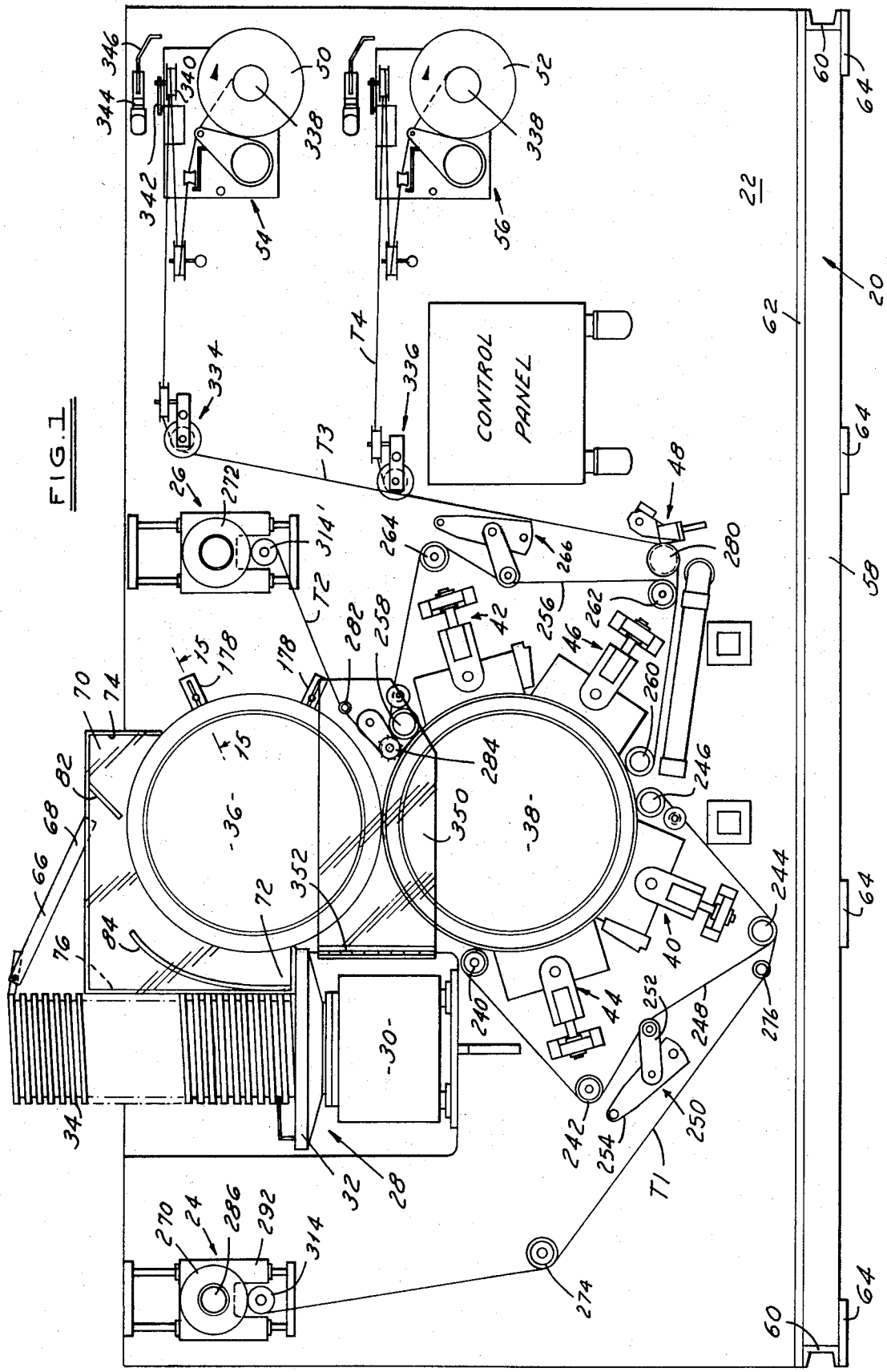
FIG. 1 is a front elevation of a seed tape making machine embodying the invention.

Referring now to the drawings, and particularly initially to FIG. 1, there is shown a machine for making seed tape, some of the machine elements being shown somewhat schematically for simplicity of illustration. The machine depicted in the drawings is designed to make two seed tapes at a time, which is done by first making a single tape containing two rows of seeds and thereafter slitting the tape longitudinally to provide two separate tapes. As will be obvious from the following disclosure, the teachings of the instant invention may be utilized to produce one, two or even more seed tapes simultaneously.

The seed tape making machine in general includes a base 20 from which upstands a flat, plate-like support 22 upon which the working parts of the machine are mounted. As previously noted, two flat strips of tape are used to form the finished seed tape and the two tapes are wound on reels which are carried by tape supporting and unwinding devices shown at 24 and 26 respectively and secured to the support 22. A seed storage and feeding facility 28 is also mounted on the support, and includes a vibratory motor 30 surmounted by a seed storage bowl 32 which communicates with the lower end of a helical track 34. The seeds are vibratorily conveyed up the track 34 upon operation of the motor in a fashion well known in the prior art. Feeders such as that shown at 28 are commercially available, and the particular device shown is a "Syntron" feeder purchasable from the Syntron Company, Homer City, Pennsylvania, modified slightly to fit this particular application.

Next there are provided a pair of circular wheels 36 and 38, each of which is mounted on a shaft journalled for rotation with respect to support 22 in a manner to be described. The axes of the wheels are preferably in vertical alignment, the upper wheel 36 being sometimes referred to hereinafter as the "seed wheel" while the lower wheel 38 is referred to as the "pocket wheel". Associated with the lower wheel 38 are a plurality, in this case four, assemblies 40, 42, 44 and 46, each of which includes a "shoe" shaped to conform to the periphery of the wheel. The shoes of assemblies 40 and 42 are heating shoes, while those of 44 and 46 are cooling shoes.

Once the dual seed tape has been completely formed and sealed, it is slit longitudinally by a slitter device 48 and the two single tapes are fed to separate spools or the like 50 and 52, upon which they are wound by winding mechanisms 54 and 56. The winders 54 and 56 are commercially available, standard pieces of equipment purchased from The Bouligny Company, Charlotte, North Carolina.

It will be understood that the seed tapes are usually sold commercially to the home gardener in fairly short lengths, say 15 or 20 feet long. Therefore, the winding of the tapes on spools 50 and 52 by the winders 54 and 56 is an intermediate step, and is done for convenience of handling and storing the tape prior to its being finally packaged in individual packages for sale in retail stores. It is possible, and in some instances desirable, to eliminate the winding operation and feed the finished seed tapes directly from the slitter 48 to another location for immediate cutting and packaging. Thus, this invention is not principally concerned with the tape winding operation per se, and is certainly not restricted to a method or apparatus including said winding operation.

The base 20 of the machine is preferably rectangular, and comprises side and end channels 58 and 60 respectively atop which rests a base plate 62. A plurality of leveling pads 64 underlie the channels and rest on the floor. The base plate 62 serves as a support for the drive means and related equipment which is positioned behind plate 22 and coupled to the various parts of the machine mounted on the front of plate 22. The drive means and auxiliary parts are thus separated from the working parts of the machine and are hidden from view, and are additionally easily accessible to maintenance personnel without traffic into the machine operating area in front of the machine as viewed in FIG. 1. The drive means and related equipment mounted behind plate 22 has not been shown because it comprises conventional mechanisms, and other comparable means could be used in lieu thereof to accomplish the intended function. As the specification proceeds, the function will be described, and it will be obvious to those skilled in the art that various well known means may be used to satisfactorily accomplish the required function.

Referring back to FIG. 1, the seeds are deposited in the bowl 32 of feeder 28, and upon activation of the feeder, are transferred up the ramp 34 to an inclined chute 66 having a free end 68 disposed above the seed wheel 36. The seeds fall by gravity upon the wheel 36, which is rotating in a counterclockwise direction as viewed in FIG. 1, so that the seeds are directed by the wheel back toward the bowl 32.

Figure 5:
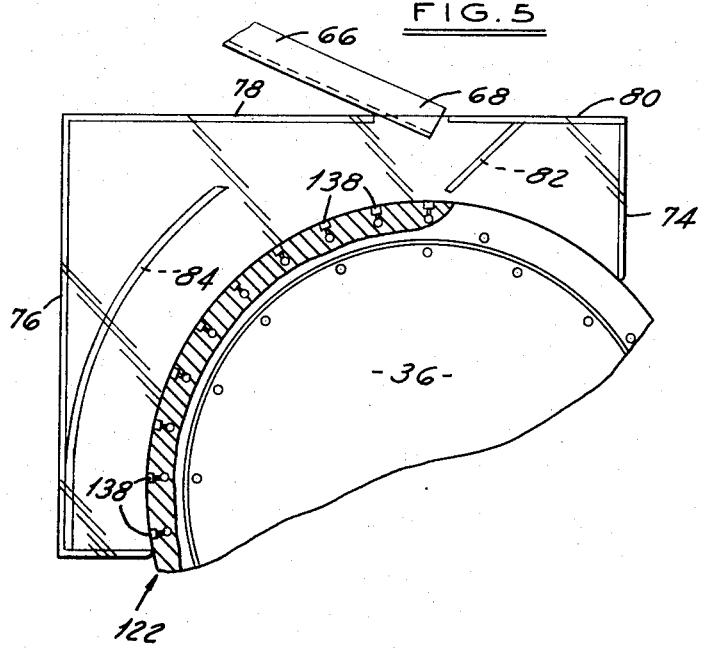
FIG. 5 is a front elevation, partly in section, showing a portion of the upper, or seed dispensing wheel, and the seed distribution baffles.

Considering FIG. 5 together with FIG. 1, there is provided a box-like structure comprising a pair of spaced side walls extending around the periphery of wheel 36, the front one of which is shown at 70, these side walls terminating in a lower end 72 spaced immediately above the bowl 32, and cooperating end walls 74 and 76. A top wall formed in two parts 78 and 80 extends between the side walls and provides an opening through which the free end 68 of chute 66 projects. A baffle 82 extends downwardly from top wall portion 80 toward wheel 36, while a second arcuate baffle 84 extends in spaced relation to the wheel periphery, as shown in FIG. 5. The seeds spilling from chute 66 impinge against baffle 82 and are directed against the wheel 36, while the baffle 84 directs the seeds delivered down chute 66 that may have been thrown away from the wheel back against it. Wall 70 is preferably constructed of a transparent material for observation of the seeds by the machine operator, and is connected to end wall 76 by bolts or the like. Some of the seeds are picked up by the seed wheel 36 in a manner hereinafter more fully described, and the remaining seeds fall back into the bowl 32 for recirculation by the feeder 28.

Seed wheel 36 and pocket wheel 38 are each supported for rotation spaced slightly from support 22 and in radially confronting alignment with each other on shafts which extend through the support. Their axes of rotation are preferably vertically aligned. The basic structure of the two wheels is substantially identical, each comprising a spindle structure to which the rings 122 and 124 to be described are attached. A description of one spindle will suffice for both. As can be seen from an examination of FIG. 3, which is a section taken through wheel 38, each of the two wheel spindles includes a base plate 88 fixed to a central hub 90, an annular member 92 secured to the face of the base plate 88 as by welding, and a face plate 94 secured to member 92 by a plurality of screws or the like 96 spaced about the marginal edge of the face plate. A tight seal is provided among the three members 88, 92 and 94, which together form a closed chamber 98 within the wheel through which cooling water or other fluid may be circulated.

Wheel hub 90 forms the forward end portion of a hollow shaft 100 journalled for rotation in bearings 102 and 104 adjacent its opposite ends, which bearings are mounted in a sleeve 106 having an integral flange 108 secured as by screws 110 to the main support 22. A rotating joint 112 is engaged upon the rear end of shaft 100 having an inner fluid supply tube 114 and an outer fluid return tube 116 terminating in an ell 118. The joint 112 is a commercially available item commonly referred to as an "All-Purpose Union", manufactured and sold by the Deublin Company, Northbrook, Illinois. It is designed to provide stationary fluid supply and return conduits to a rotating member.

Cooling water or other fluid is thereby supplied to cavity 98 of wheel 38 during rotation through the forward end 120 of tube 114, and is returned via return tube 116 and ell 118. Tubes 114 and 118 are connected through suitable fittings to conduits (not shown) leading to a source of cooling fluid. Preferably, the cooling fluid is water, and a refrigeration unit is mounted on the base plate 62 behind support 22 (FIG. 1) to provide continuous cooling to both of the wheels 36 and 38, although it is obvious that the source of cooling fluid could be located remote the machine if desirable.

Figure 3:
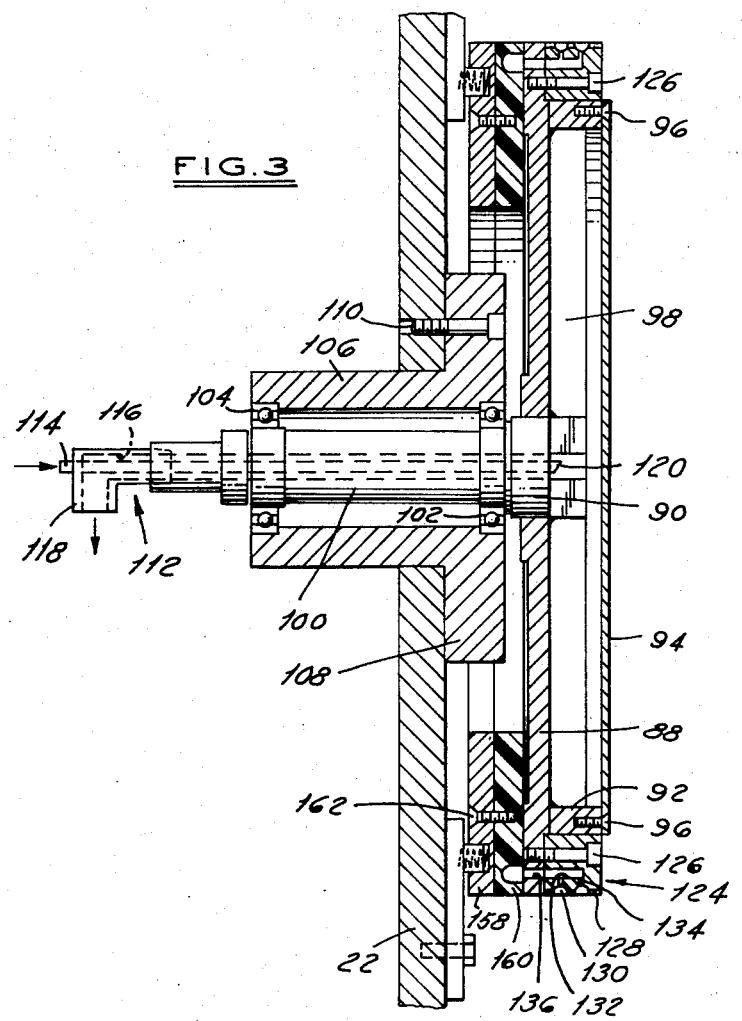
FIG. 3 is a cross section through the lower pocket forming wheel taken along line 3—3 of FIG. 2.

The difference between the two wheels 36 and 38 lies in an outer ring member which is the actual seed handling part of each wheel. The ring of wheel 36 is shown at 122 in FIGS. 5 and 6, while the ring of wheel 38 is shown at 124 in FIGS. 3 and 4. The two rings 122 and 124 are similar in general construction and configuration, but differ in certain specifics which are to be described. Each ring is secured to its respective base plate 88 by cap screws or the like 126 as shown in FIG. 3. Considering first pocket wheel 38, the ring 124 is provided with a peripheral band 128 of resilient material such as rubber or the like. A plurality of shallow pockets 130 are formed in the ring periphery and these pockets open through band 128. In the illustrated embodiment, two rows of pockets are provided spaced axially apart a predetermined distance, and the pockets of each row are spaced uniformly apart about the ring periphery. Each of the pockets 130 communicates with a lateral aperture 132 by means of a small hole 134. Each aperture 132 connects with corresponding aligned aperture 136 in back plate 88, thereby establishing fluid conducting communication between each pocket and a part to be described which is in engagement with the rear face of wheel back plate 88.

The seed wheel 36 is of similar construction in that it is provided with a plurality of seed pickup ports 138 corresponding in number and spacing to the pockets 130 of wheel 38. Each port 138 communicates with a lateral aperture 140 by means of a small hole 142 in identical fashion to that above described with reference to wheel 38. The configuration of the seed pickup ports 138 is dependent upon the size and shape of the particular seeds being handled, it being essential that each port is sized and shaped so as to pick up only a single seed. Likewise, the pockets 130 in the periphery of wheel 38 are dimensionally related to the particular seeds being handled. As each of the rings 122 and 124 are easily removable from their respective wheels by merely unthreading screws 126, a plurality of rings of each type 122 and 124 may be provided, each sized and configured to handle a particular kind of seed, and the rings may be interchanged.

Interposed between each wheel 36 and 38 and the plate 22 are what may be termed commutators, which serve to supply air under pressure or vacuum to the pockets 130 and seed pickup ports 138 above described. Referring to FIG. 2, the periphery of ring 122 on seed wheel 36 is shown in phantom at 36', while the periphery of ring 124 on pocket wheel 38 is indicated at 38'. Commutators 150 and 152 are provided for wheel 36 while commutators 154 and 156 are provided for wheel 38. Each of the commutators is generally arcuately shaped and has a flat forward face which is shown in FIG. 2 for mating engagement with the rear face of a respective wheel back plate 88. The commutators are mounted on plate 22, and are held stationary with respect to the wheels 36 and 38, in the arrangement shown in FIG. 2. As the face of each commutator bears frictionally against a back plate which is moving with respect thereto, the bearing face is preferably made of a relatively hard, wear-resistant plastic material, such as Delrin (trademark of E. I. DuPont de Nemours & Co. for acetal resins). As shown in FIG. 3, which shows commutators 154 and 156 in section, they may be constructed in two parts, 158 and 160, the former being of lightweight metal such as aluminum, while the latter is of Delrin or similar plastic. The two sections are secured together by screws 162.

An arcuate groove or slot 164 is formed as by a milling operation in the front face of commutator 150, while similar grooves 16 and 168 are formed in members 154 and 156 respectively. The curvature of these grooves is such that they are in axially confronting relation with the transverse apertures 132. As can be seen in FIG. 2, groove 164 extends through an arc of somewhat more than 180°, and terminates at its upper portion in an end 170 positioned about 25 degrees clockwise of the vertical centerline of the wheel 36. The lower portion terminates in an opposite end 172 spaced a very few degrees, e.g., seven, counterclockwise from the vertical. The position of slot end 172 must be fairly closely controlled, as its position determines the point at which the seeds are released for deposit into the tape wound about lower wheel 38.

Figure 4:
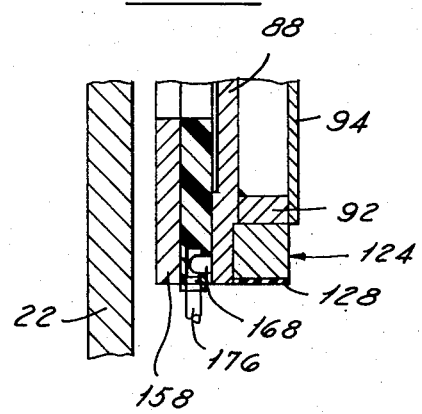
FIG. 4 is a partial cross section similar to FIG. 3 showing details of construction of the pocket forming wheel.

Slots 166 and 168 are similar to slot 164 above described in that each is positioned to communicate with corresponding apertures 132. These two slots terminate at opposite ends adjacent the ends of their commutators, which are sized to co-act with other parts of the device to be described. Each of the slots 164, 166 and 168 communicates with one or more transverse passages 174 opening through the outer diameter of the commutator, as shown in FIGS. 2 and 4, and the passages are in turn each connected to flexible conduits such as shown at 176 in FIG. 4 by suitable fittings. As is more fully described hereinafter, slot 164 in member 150 and slot 166 in member 154 are connected by conduits such as 176 to a source of vacuum, while slot 168 in member 156 is connected similarly to a source of fluid under pressure. Each commutator is supported on plate 22 by bracket assemblies, such as those shown at 178 in FIG. 1 for commutator 152.

Figure 15:
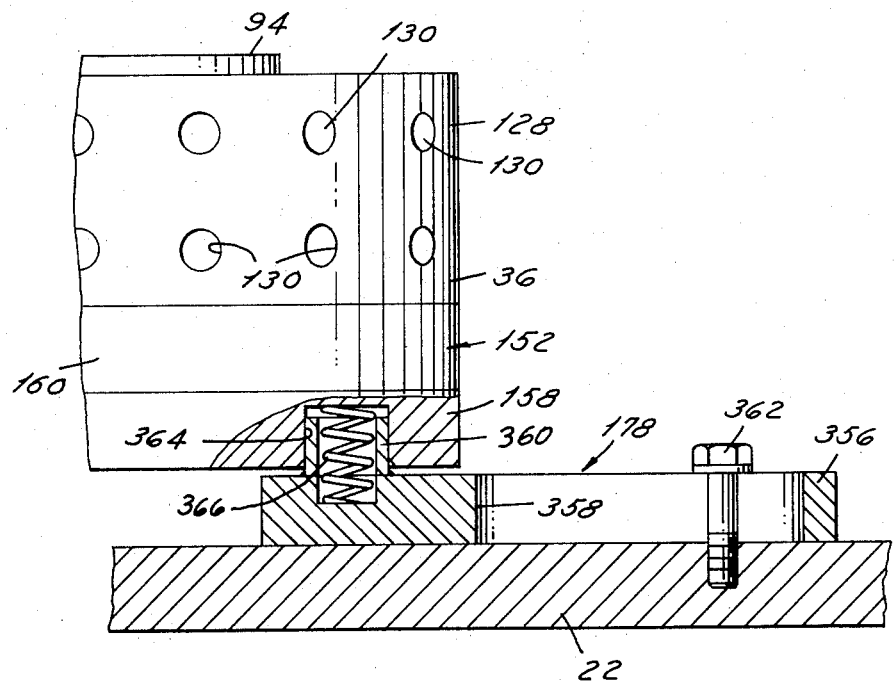
FIG. 15 is a section taken on line 15—15 of FIG. 1 showing the mounting of the commutators of FIG. 2.

Each of the commutators is mounted on a plurality of the bracket assemblies 178, one of which is shown in section in FIG. 15. Such comprises an elongate base 356 having a longitudinal slot 358 therein, and an upstanding hollow cylinder 360 secured adjacent one end of the base. A bolt 362 is threaded into a suitable aperture in support plate 22 to secure the assembly, which is adjustable within the limits of slot 358. The cylinder 360 slidably projects into a recess 364 in commutator 152, and a coil spring 366 is disposed therein bearing against the commutator, thereby urging it into engagement with the back plate 88 of wheel 36. The bracket assemblies thereby maintain their associated commutators stationary with respect to wheels 36 and 38 while providing a spring to keep the parts in intimate engagement with the commutator slots in communication with the wheel apertures.

Turning back to FIG. 1, a pair of hot shoe assemblies 40 and 42 and a pair of cold shoe assemblies 44 and 46 are shown, the construction of all four shoes being identical except that shoes 40 and 42 are provided with electrical heating elements, while shoes 44 and 46 are provided with fluid conducting passages for the circulation of cooling fluid such as water therethrough. The shoes are arranged about the periphery of wheel 38 in the positions shown to heat and cool the tape film as it passes around the wheel.

In FIGS. 9–11 the construction of the shoes 40, 42, 44 and 46 is shown, FIGS. 9 and 10 being side and top elevations respectively of a cooling shoe 44 or 46, while FIG. 11 is a partial side elevation of a heating shoe. Each of the shoes comprises a body 180 having a surface 182 corresponding in curvature to the wheel 38, and pivotally mounted between two legs 184 and 186 of a yoke 188 on a pin 190. Yoke 188 is fixed to a block 192 having a pair of spaced arms 194 and 196 carrying bearings 198 and 200. Block 192 is supported for shiftable movement on two spaced parallel shafts 202 and 204, which are in turn carried by members 206 and 208. Screws 210 threaded into plate 22 secure member 206 thereto, while member 208 is similarly secured by screws 212. Shaft 202 extends between members 206 and 208 through bearings 194 and 196 and is retained against movement by a dowel pin 214. Shaft 204 is secured by dowel 216 to block 192, and projects through a bearing 218 supported in member 206. A small air cylinder 220 is mounted on member 206 and has a piston rod 222 connected to block 192 for shifting the shoe body 180 toward and away from the wheel 38.

Each of the cooling shoes 44 and 46 are provided with at least one fluid passage 224 connected at opposite ends by fittings 226 to cooling fluid conducting hoses 228 and 230 which serve to circulate cooling water or other fluid through the shoe body. As noted previously, a refrigeration unit may be made a part of the apparatus itself, in which event it may be mounted on base plate 62, or a unit may be located remote the machine and the cooling water piped thereto. Turning to FIG. 11, each heating shoe 40 and 42 is provided with a resistance heating element 232 therein connected to electrical conductor means 234 in an enclosure 236 mounted on the end of the shoe body 180.

Returning to a consideration of FIG. 1, the shoes 40, 42, 44 and 46 are strategically positioned about the periphery of wheel 38 to operate in pairs, i.e. shoes 40 and 44, and shoes 42 and 46. Entrained about a plurality of rollers 240, 242, 244 and 246 is a continuous belt 248 which is interposed between the wheel 38 and shoes 40 and 44. The belt 248 is relatively thin and has a non-stick surface. A glass filled fabric having a teflon coating on the wheel confronting surface thereof has been found to function with good results. At least one of the rollers 240, 242, 244 and 246 is powered to drive the belt at a speed corresponding to the peripheral speed of wheel 38, and the rollers are covered with rubber or like material having a high co-efficient of friction for non-slip driving of the belt.

A belt tension device 250 comprising an arm 252 having a roller at its free end is spring biased against the belt to maintain belt tension, the arm being pivotally mounted on plate 22 by means of bracket 254. Another similar belt 256 is entrained about rollers 258, 260, 262 and 264 and is driven in the same fashion between wheel 38 and shoes 42 and 46. A tension device 266 similar to 250 is provided to maintain tension on belt 256. The belt drive rollers for each of the belts 248 and 256 are preferably driven by a common drive together with wheels 36 and 38, and all are driven at a synchronous peripheral speed.

A first roll of tape 270 is positioned on tape unwinding mechanism 24, while a second roll 272 is positioned on unwinder 26. Tape from the first roll 270 identified by T1 is fed around quide rollers 274 and 276, thence over belt 248 and around wheel 38 all the way from roller 246 to roller 260, along belt 256 and over another roller 280 which forms a part of the slitter device 48. Tape from unwinder 26 indicated at T2 is fed over rollers 282 and 284 into engagement with wheel 38 and overlying tape T1, passing around the wheel where the two tapes are bonded together.

The two unwinders 24 and 26 are identical, and a description of one will suffice for both, the structure being shown in FIGS. 12–14, the device 24 being shown therein. Each comprises a hub 286 freely rotatably supported on a shaft 288 having a bearing 290 mounted in a carrier plate 292. The tape is wound on a hollow cylindrical core of cardboard or the like, and hub 286 has a tapered end 294 over which the core is slipped for frictional engagement on a cylindrical hub portion 296 which prevents relative rotation between the hub and tape roll. A pair of spaced parallel rods 298 and 300 are fixed in spaced relation to the support plate 22 by a pair of brackets 302 and 304 and extend through bearings 306, 308 and 310, 312 respectively, which are secured to the rear of carrier plate 292. A powered drive roller 314 is fixed on a shaft 316 which extends through plate 22 and is connected at its rear end to a pulley or the like 318 which is coupled to the drive motor (not shown).

To position a roll of tape 270 in the unwinder 24, the hub 286 and plate 292 are raised on rods 298 and 300, and the tape core pressed onto hub portion 296. The tape roll then rests on power roller 314, which is provided with end flanges 320 and 322 to keep the tape aligned on the roller. Rotation of roller 286 in a counterclockwise direction as indicated by the arrows in FIG. 12 unwinds the tape from roll 270 for feeding to the wheel 38. Atop the support 22 is mounted a laterally extending arm 324 from which depend a pair of guide rods 326 and 328 disposed on opposite sides of the tape roll 270 to keep it properly aligned during unwinding. As can be seen from FIG. 1, the powered roller 314' of unwinder 26 rotates in the opposite, or clockwise direction, but otherwise the two devices 24 and 26 are identical.

Figure 8:
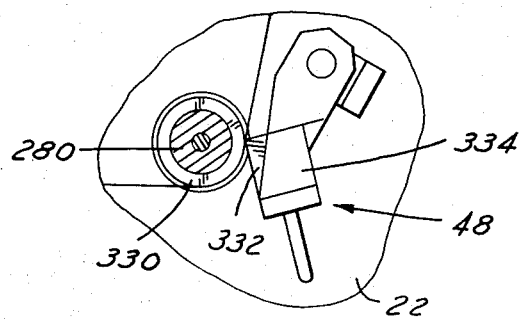
FIG. 8 is a front elevation of a slitter mechanism used to slit the completed tape having two rows of seeds to provide two single seed tapes.

To ready the machine for operation, rolls of tape 270 are placed on the unwinders 24 and 26, and tape from each is manually threaded around the wheel 38 as set forth above, the pistons of the shoe assemblies 40, 42, 44 and 46 being retracted to permit passage of the tape. The juxtaposed tapes are wound about roller 280, past slitter 48 where they are slit longitudinally, and the slit tapes are started onto the spools 50 and 52 of winders 54 and 56. Roller 280 has a circumferential slot 330 therein into which projects a sharp blade 332 (FIG. 8) of the slitter 48, which includes a blade holder 334. As the tape passes around roller 280 it is slit by the blade 332.

There is provided a common motive means, such as an electric motor, for driving the two unwinders 24 and 26, the wheels 36 and 38 and the rollers which power the belts 248 and 256, all of which may be connected to the motor as by chains and suitably sized sprockets so that the velocity of the tape strips T1 and T2 is equal to the peripheral speed of the wheels 36 and 38. Bowl 32 is supplied with seeds, and feeder 28 actuated to feed seeds up ramp 34 and into chute 66, from where they spill onto seed wheel 36. The pistons of shoe assemblies 40, 42, 44 and 46 are actuated to extend the shoes into engagement with belts 248 and 256, which in turn contact the outer band of wheel 38. The main drive motor is started to feed the tapes and turn wheels 36 and 38.

As wheel 36 rotates counterclockwise, the seed pickup ports 138 (FIG. 5) are supplied with vacuum as they reach a position opposite groove 164 in commutator 150. Thus, as the seeds spill onto the top of wheel 36, a single seed is picked up by each seed pickup, and is carried thereby counterclockwise toward the point of tangency between wheels 36 and 38. Vacuum is released when each pickup means passes the lower end 172 of slot 164 (FIG. 2), and the seed is deposited on carrier tape T1 on wheel 38 (FIG. 6).

Pocket wheel 38 is rotated in a clockwise direction (FIG. 1) and as the pockets 130 pass slot 168 of commutator 156, they are connected via the slot 168 with a source of air under pressure. At about the same time, the pockets are disposed in confrontation with heating shoe 40, so that the tape strip T1 is heated as it passes commutator slot 168 and air pressure is applied simultaneously to the tape through pockets 130. The heating softens the tape sufficiently to make it deformable, and the air pressure thereagainst tends to bulge the tape outwardly against belt 248. As each pocket passes beyond commutator slot 168, it is still disposed opposite the heating shoe 40, and the tape is still deformable, and it then passes opposite commutator 154, the slot 166 of which is connected to vacuum, so that the tape is drawn against and into the wheel pockets 130, thereby conforming the tape to the pockets. The formed tape is passed over the cooling shoe 44 substantially immediately after deformation, so it is cooled to a stable temperature.

Figure 6:
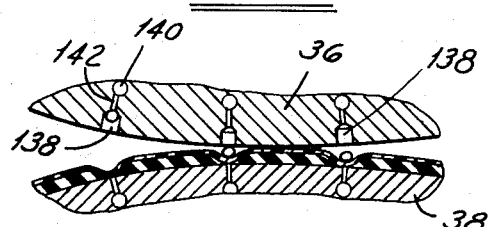
FIG. 6 is an enlarged partial section showing the relationship of the wheels of the preceding FIGS. at their point of juxtaposition.

Continued rotation of wheel 38 brings each pocket formed in the tape to the point where the two wheels 36 and 38 are tangent, as shown most clearly in FIG. 6. At a point just before the wheels meet, the seed pickups 138 of wheel 36 pass beyond slot 164 of commutator 150 (FIG. 2), and each seed is deposited in a pocket of the tape. The tape with a seed in each pocket then continues to move with wheel 38 and the cover tape T2 is fed around roller 284 (FIG. 1) into superposition over tape T1. The two tapes are thereafter sealed together by heat from heating shoe 42, and then immediately pass cooling shoe 46 which returns the tape to lower temperature. If it is found desirable to slightly moisten the tape marginal edges to enhance the seal, such may be accomplished by a wick or the like (not shown) upstream of the heating shoe 42. Any moisture applied to the tape will be immediately evaporated when the tape passes shoe 42, avoiding any deleterious effect of moisture on the seed. The sealed tape passes around roller 260 and is fed to the slitter 48 where it is slit longitudinally to provide two separate seed tapes each having a row of uniformly spaced seeds therein, as shown in FIG. 7 in cross section.

Figure 7:
FIG. 7 is a cross section through a completed seed tape.

Referring to FIG. 1, roller 284 is preferably provided with a plurality of needle-like projections 330 which pierce small holes 332 in cover tape T2, each of which holes overlie a seed as shown in FIG. 7. This provides for air escapement for each seed containing pocket in the finished tape, and when the tape is wound on the spools 50 and 52, it will be flattened because the air can escape from the pockets, and the tape will not be as bulky.

Each of the winders 54 and 56 is a purchased unit and will not be described in detail. The finished tapes T3 and T4 are entrained over guide roller assemblies 334 and 336 respectively, and thence to the winders. The spools 50 and 52 are received over rotatable shafts 338, and the tapes are each threaded over a roller 340 mounted on the end of an arm 342 pivoted at its opposite end to the winder base and spring biased to maintain tension on the tape. A switch 344 mounted on plate 22 has a switch arm projecting into the plane of arm 342. In the event the tape breaks, arm 342 swings into contact with switch arm 346, actuating the switch to shut down the associated winder.

The two tapes T1 and T2 are continuously fed to wheel 38, where seed containing pockets are formed in tape T1, and a single seed is deposited in each pocket by seed wheel 36, after which tape T2 is superposed over tape T1, and the tapes are heat sealed together. In the illustrated embodiment, where two tapes are formed simultaneously, slitter 48 slits it to form single seed tapes T3 and T4, which are then wound up on spools 50 and 52 by winders 54 and 56. A transparent guard 350 may be provided covering portions of the two wheels 36 and 38 to prevent injury to the machine operator and keep foreign matter away from the wheels. Guard 350 may be hinged at 352 at swing away and permit access to the wheels.

What is claimed is:

1. A method of manufacturing a seed tape comprising:
   moving a first elongate strip of water soluble tape at a constant speed,
   forming a series of uniformly longitudinally spaced apart pockets in the moving strip of tape,
   moving at the speed of said strip of tape a series of recesses, which are sized to only receive a single seed and are longitudinally spaced apart corresponding to said pocket spacing, in a recyling path from a point remote from said tape into conjunctive recess-to-pocket registration therewith,
   inducing a partial vacuum at the bottom of each recess during movement between said point and the recess-to-pocket registration,
   spilling a continuous stream of free falling seeds onto said recesses during their movement between said point and the recess-to-pocket registration to catch a single seed in each recess,
   discontinuing the induced partial vacuum of each recess when in registry with the pocket to release a seed from each recess into the pocket, and
   moving a second elongate strip of water soluble tape at the same speed as and into conjunction with and covering the pockets in the first strip of tape following deposit of each seed in a pocket and sealing the strips of tape together around each pocket.

2. A method as defined in claim 1 characterized by forming said seed retaining pockets by heating said first tape, drawing a vacuum on said tape and thereafter cooling the tape.

3. A method as defined in claim 1 characterized by sealing said first and second tapes together by applying heat to the moving tapes.

4. A method of manufacturing a seed tape comprising:
   moving a first elongate strip of water soluble tape at a constant speed,
   forming a series of uniformly longitudinally spaced apart pockets in the moving strip of tape, rotating a wheel at a peripheral speed corresponding to said tape speed, with said wheel having a plurality of uniformly spaced apart peripherally opening recesses each sized to contain a single seed,
   spilling a continuous stream of free-falling seeds onto the periphery of said wheel and against the peripherally opening recesses while simultaneously drawing a partial vacuum on each such recess to catch a single seed in each recess,
   leading the strip of tape with the formed pockets into pocket-to-recess tangency with said wheel remote from the falling seed stream and ejecting a single seed into each pocket, and
   closing the pockets of the first strip of tape by juxtaposing a second strip of tape over the first strip and sealing the two strips together.

5. The invention defined by claim 4 characterized by catching those seeds not caught in said recesses and returning them to said continuous stream.

6. Apparatus for manufacturing seed tape comprising, a
   seed dispensing station,
   means for moving a first elongate strip of water soluble tape at a constant speed beneath said seed dispensing station,
   means upstream of the dispensing station for forming a series of substantially uniformly spaced seed retaining pockets in said first tape,
   means for selecting certain of said seeds from said seed dispensing station and depositing a seed in each pocket comprising a seed wheel rotating on a horizontal axis having seed pickup means at uniformly spaced intervals about the wheel periphery, said seed dispensing station being positioned above said seed wheel to deposit seeds by gravity thereon,
   means for moving a second elongate strip of water soluble tape synchronously with said first tape and into juxtaposition with the first tape at a point downstream of said seed dispensing station, and
   means for sealing said first and second tapes together to provide a series of closed seed containing pockets spaced uniformly along said tapes.

7. Apparatus as defined in claim 6 characterized in that said seed pickup means each comprises a radially opening aperture connected to a source of vacuum and sized to retain a single seed against the marginal edges of the aperture.

8. Apparatus as defined in claim 6 characterized in that a source of seeds is provided, together with means for delivering seeds from said source to said seed dispensing station.

9. Apparatus as defined in claim 8 characterized in that means are provided for returning excess seeds deposited on said seed wheel from said seed dispensing station back to said source of seeds.

10. Apparatus as defined in claim 6 characterized in that said means for forming said seed retaining pockets in the first tape comprises a wheel rotating on a horizontal axis generally beneath and in radial alignment with said seed wheel, said pocket wheel having a uniformly spacedapart series of pockets opening through its periphery, with each pocket connectable to a source of vacuum, and means for entraining said first tape over said pocket wheel.

11. Apparatus as defined in claim 10 characterized in that heating means are provided for softening said tape prior to the forming of said pockets.

12. Apparatus as defined in claim 6 characterized in that said means for sealing the first and second tapes together comprises tape heating means mounted adjacent said pocket wheel for beating the juxtaposed tapes on the wheel.

13. Apparatus for manufacturing seed tape from a pair of elongate strips of water soluble tape material, comprising:
   a generally upright support;
   a seed dispensing wheel mounted for rotation about a horizontal axis on said support and having a plurality of seed pickup means spaced apart uniformly around its circumference for picking up seeds by vacuum during a portion of wheel rotation and releasing seeds at a predetermined point of wheel rotation;
   a pocket forming wheel mounted for rotation about a horizontal axis on said support beneath and in radial alignment with the seed wheel and tangent thereto, said pocket wheel having a plurality of pockets opening through its periphery corresponding in position and arrangement to said seed pickup means;

drive means coupled to both of said wheels for rotating them synchronously;

means for moving a first strip of tape along the periphery of said pocket wheel at a speed corresponding to the peripheral speed of the wheel;

means associated with said pocket wheel for deforming said first tape into said wheel pockets to form seed retaining pockets in said tape;

a source of seeds;

means for delivering a stream of free falling seeds from said source and depositing the seeds on the seed wheel for pick up by said pickup means;

said wheels being relatively positioned for deposition of a seed from said seed wheel into each tape pocket along said pocket wheel upon rotation of the wheels;

means for moving a second water soluble strip of tape synchronously with said first strip of tape and into juxtaposition therewith after deposition of seeds in the pockets of the latter; and means for sealing said two tapes together to close said pockets with seeds enclosed therein.

14. Apparatus as defined in claim 13 characterized in that said seed wheel pickup means comprises a series of uniformly spaced apertures opening radially through the wheel periphery and passage means establishing communication between said apertures and a source of vacuum.

15. Apparatus as defined in claim 14 characterized in that said passage means includes a stationary commutator member having an arcuate passageway and passageway means in said rotary seed wheel communicating with said apertures and with said commutator.

16. Apparatus as defined in claim 15 characterized in that said member is floatingly secured to said support and is spring biased into engagement with said seed wheel.

17. Apparatus as defined in claim 16 characterized in that said arcuate commutator passage comprises a groove in the commutator surface adjacent the seed wheel.

18. Apparatus as defined in claim 13 characterized in that said seed dispensing wheel has a plurality of rows of said seed pickup means and said pocket forming wheel has a corresponding number of rows of pockets, whereby a plurality of seed tapes are formed simultaneously.

19. Apparatus as defined in claim 18 characterized in that tape slitting means is positioned downstream of said tape sealing means for separating the sealed tapes into said plurality of seed tapes.

* * * * *